Patented Sept. 11, 1923.

1,467,356

UNITED STATES PATENT OFFICE.

HARRY ANDY COOK, OF YAKIMA, WASHINGTON.

COMPOSITION OF MATTER FOR USE AS A CEMENT.

No Drawing.    Application filed March 21, 1921.    Serial No. 454,138.

*To all whom it may concern:*

Be it known that I, HARRY A. COOK, a citizen of the United States, residing at Yakima, in the county of Yakima and State of Washington, have invented a new and useful Composition of Matter for Use as a Cement, of which the following is a specification.

This invention relates to a composition of matter for use as an adhesive cement, and one of its objects is to provide a cement which is cheap to manufacture and efficient in use.

With the foregoing and other objects in view the invention consists of the following ingredients substantially in the proportions stated:

| | |
|---|---|
| Pure rubber | 8 pounds. |
| A rubber solvent (benzol) | 10 gallons. |
| Ground white shellac | ¼ pound. |
| Alcohol (180 proof) | 6 pints. |
| Powdered white rosin | 1 pound. |
| Oil of sassafras | 8 ounces. |
| Ether | 8 ounces. |

In making the adhesive cement the rubber is cut into small squares and put in a container with substantially 10 gallons of benzol or with enough benzol to make substantially 10 gallons of the mixture. This mixture is stirred continuously until the rubber is dissolved. One quarter pound of ground white shellac in a dry state is added to 3 pints of alcohol and dissolved therein. In another container 1 pound of powdered white rosin is dissolved in 3 pints of alcohol. These two solutions of shellac and rosin are then mixed together thoroughly by stirring in with the rubber solution after which the oil of sassafras and the ether are added and the entire mixture is stirred for one-half an hour. It is then ready to be canned and used.

What is claimed is:—

A composition of matter for use as an adhesive cement including a solution of pure rubber in benzol in the proportions of eight pounds of rubber to sufficient benzol to make approximately ten gallons, a solution of one quarter pound of ground white shellac in three pints of alcohol, a solution of powdered white rosin in three pints of alcohol, said solutions being thoroughly mixed with eight ounces of oil of sassafras and eight ounces of ether.

In testimony that I claim the foregoing as my own, I have hereto affixed my signature in the presence of two witnesses.

HARRY ANDY COOK.

Witnesses:
 F. H. SWEET,
 GEO. H. MULLINS.